L. GOULD.
Planing-Machines.

No. 144,199.  Patented Nov. 4, 1873.

WITNESSES.
Rufus M. Ladd.
B. H. Rogers.

INVENTOR
Lyman Gould

UNITED STATES PATENT OFFICE.

LYMAN GOULD, OF NORWICH, CONNECTICUT.

IMPROVEMENT IN PLANING-MACHINES.

Specification forming part of Letters Patent No. 144,199, dated November 4, 1873; application filed May 9, 1873.

*To all whom it may concern:*

Be it known that I, LYMAN GOULD, of Norwich, in the county of New London and State of Connecticut, have invented certain new and useful Improvements in Planing-Machines; and I do hereby declare the following to be a full, clear, and exact description of the same, reference being had to the accompanying drawings, which form a part of this specification, and in which—

Figure 1:
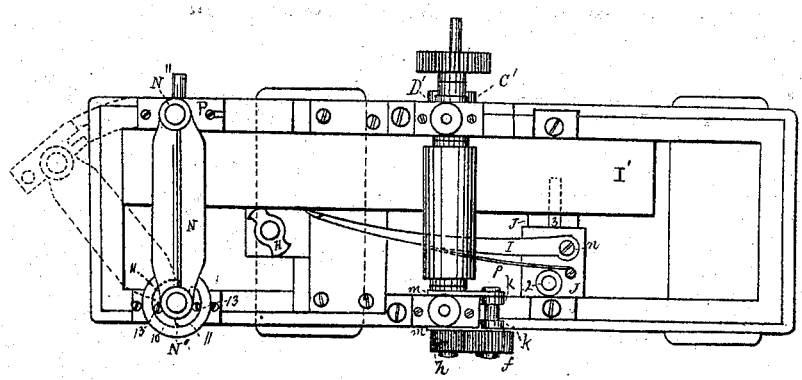
Figure 2:
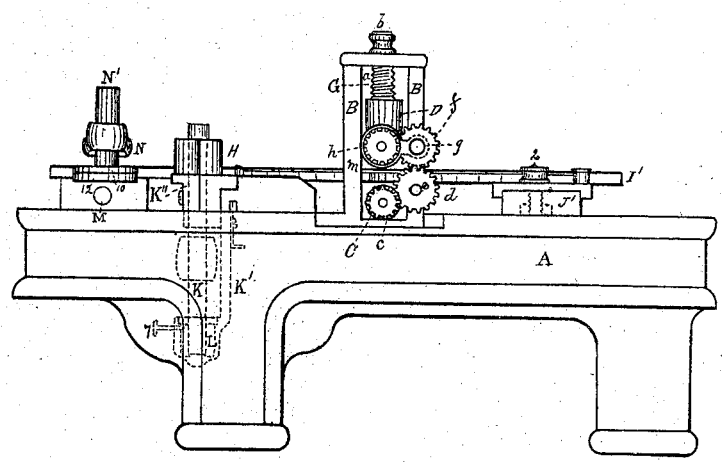
Figure 3:
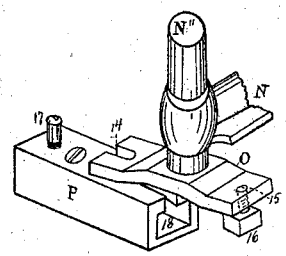

Figure 1 represents a top or plan view of so much of a planing and matching machine as is necessary to illustrate my present invention. Fig. 2 represents a side view of the parts shown in Fig. 1; and Fig. 3 represents a perspective view of a detached part of the machine, which will be hereafter more fully explained.

To enable those skilled in the art to which my invention belongs to make and use the same, I will proceed to describe it in detail.

The nature of my said invention relates to improvements connected with the pressure-bar, whereby the latter can be turned, as and for the purposes hereafter explained.

In the drawings, the part marked A is the frame of the machine, upon which are fastened the frames B B, in which the bearings or boxes C D C' D' of the journals of the rear feed-rolls are fitted to turn. The bearings or boxes D D' of the upper feed-roll are fitted to work up and down in slots $a$ in frames B B, and are held down by screws G, which are to be combined with yielding springs in any well-known manner. Screws G have thumb or other shaped heads $b$, by means of which they can be turned up or down, as occasion may require, to adjust the roll. To give the upper feed-roll of a planing and matching machine the capacity or freedom to rise and fall to conform to the inequality of the board, and yet remain in proper connection with the driving gearing without undue wearing and straining of the parts, to one end of the journal of the lower feed-roll is secured a gear, $c$, which takes into gear $d$, which turns on the end of a stationary journal, $e$, while gear $d$ meshes into gear $f$, which turns on a stud, $g$, and gear $f$ turns gear $h$, fast on the end of the journal of the upper feed-roll. Upon the ends of the stationary stud $e$ are arranged two straps or links, $k$ $k$, through the upper ends of which is passed the stud $g$. Two other straps or links, $m$ $m$, are also slipped or clasped about the ends of stud or journal $g$, their forward ends being clasped about or slipped upon the ends of the box or bearings of the journal of the upper feed-roll. The joints of the links or straps $k$ $k$ and $m$ $m$ are loose enough to allow the straps or links to swing upon their bearings without undue friction. With this construction of the parts, it will be seen that, as the upper feed-roll rises and falls to conform to the inequalities of the board, the front ends of the straps or links $m$ $m$ will be elevated or depressed, as the case may be, while the straps or links $k$ $k$ will also swing upon the stud $e$, thereby preventing all binding of the parts, and yet retaining the gears in proper mesh. As the studs or journals $e$ and $g$ are stationary, or do not revolve with their gears $d$ and $f$, there is little, if any, perceptible wearing of the straps or links. Then, again, the same is true of the forward bearings of the links $m$ $m$, since they are fitted upon the hubs of the boxes of the journal of the feed-roll, which only has a slight up-and-down motion. To prevent the edge of the board from being split or shivered up by the action of the matching-cutter, (represented at H,) a long pressure-arm, I, is arranged to turn on a journal or pivot, $n$, while a long flat-shaped spring presses the forward end up against the edge of the board I'. 2 is a thumb-screw, by means of which the sliding piece J, to which the arm and spring are secured, can be moved nearer to or farther from the edge of the board, or otherwise adjusted for narrow or wide boards. Piece J is fitted to slide back and forth on the cross-piece J', which is provided with a slot, 3, through which the thumb-screw 2 passes, a clamping-nut being fitted to the lower end of the screw, but prevented from turning when the screw is turned, in consequence of its being fitted in a long recess in the lower side of the piece J'.

It will be seen that the device is quite simple, not liable to become clogged or get out of order, while at the same time it can be adjusted with safety while the machine is in operation.

The vertical matched head spindle or shaft K is supported at its upper end by a sliding frame, K', having a bearing, K'', and these parts may be made in any well-known modes of manufacture. The position of the shaft of the lower planing-cylinder is shown at M, and N is the pressure-bar, under which the material passes, and by which it is held down to the cutters, which plane its under side. It often happens that it becomes necessary to adjust the knives, change them, or make repairs of the knives, or the parts which hold them, and which operations are attended with considerable inconvenience and delay, as the pressure-bar has heretofore been combined with the machine. I make the pressure-bar N and its standards N' N'' so that they can be turned or swung round, as indicated in dotted lines, Fig. 1. One practical way in which this can be done is shown in my machine. Standard N' is attached to a circular plate or flange, 10, having two circular grooves or slots, 11, with screws to hold it to lower plate, 12, as indicated in Fig. 1. The other standard, N'', is fastened to a piece, O, having a slot, 14, in one end, and a screw or bolt, 15, in the other, a large nut, 16, being arranged upon the end of bolt or screw 15.

When it is desired to reach or uncover the lower cutters under the pressure-plate N, screws or bolts 13, 15, and 17 are loosened, when one end of the pressure-bar can be swung around so as to uncover the cylinders and the cutters. When the parts are to be arranged in place again, bar N is turned so that nut 16 will enter the slot 18 in the piece P, and slot 14 receives the shank of the screw or bolt 17, after which said screws or bolts are tightened up, and the parts will be secured in position, as shown in full lines, Figs. 1 and 2.

The parts 12 and P are to be fastened securely to the sides of the frame in any convenient manner.

In Fig. 3 one end of the pressure-bar and its standard N'', and the parts connected therewith, are shown upon an enlarged scale, for the purpose of illustrating the construction of the parts more fully.

The pressure-bar and the parts connected therewith may be constructed in a different manner and still embrace and cover the principles of my said invention.

It will be understood that the pressure-bar and its standards are to be made so that the bar can be adjusted up or down, in the usual manner.

Having described my improved planing and matching machine, what I claim therein as new and of my invention, and desire to secure by Letters Patent, is—

The combination, with the pressure-bar or plate N and its standards N' N'', of the slotted flange 10, stationary flange 12, slotted pieces O and P, and fastening screws or bolts 15 and 17, substantially as and for the purposes set forth.

LYMAN GOULD.

Witnesses:
RUFUS M. LADD,
B. H. ROGERS.